US008035998B2

(12) United States Patent
Kada et al.

(10) Patent No.: US 8,035,998 B2
(45) Date of Patent: Oct. 11, 2011

(54) SWITCHING POWER SUPPLY (75) Inventors: Kyohei Kada, Hikone (JP); Mikio Itou, Hikone (JP); Sumio Wada, Hikone (JP); Shousuke Akisada, Hikone (JP); Atsushi Isaka, Hikone (JP); Kenji Obata, Hikone (JP)

(73) Assignee: Panasonic Electric Works Co., Ltd., Kadoma-shi (JP)

( * ) Notice: Subject to any disclaimer, the term of this patent is extended or adjusted under 35 U.S.C. 154(b) by 480 days.

(21) Appl. No.: 12/308,167

(22) PCT Filed: Jun. 29, 2007

(86) PCT No.: PCT/JP2007/063103
§ 371 (c)(1),
(2), (4) Date: Dec. 9, 2008

(87) PCT Pub. No.: WO2008/001890
PCT Pub. Date: Jan. 3, 2008

(65) Prior Publication Data
US 2009/0303752 A1 Dec. 10, 2009

(30) Foreign Application Priority Data
Jun. 30, 2006 (JP) .................................. 2006-182465

(51) Int. Cl.
*H02M 3/335* (2006.01)
(52) U.S. Cl. .................. 363/19; 353/21.14; 323/222
(58) Field of Classification Search ............ 363/16–20, 363/21.02, 21.14, 21.13, 21.18, 56.03, 97, 363/132, 89, 96; 323/207, 222, 282, 288, 323/285
See application file for complete search history.

(56) References Cited

U.S. PATENT DOCUMENTS

| | | | | |
|---|---|---|---|---|
| 4,190,882 A | * | 2/1980 | Chevalier et al. | 363/26 |
| 5,583,398 A | * | 12/1996 | Dellamano et al. | 315/247 |
| 5,796,595 A | * | 8/1998 | Cross | 363/71 |
| 6,285,566 B1 | * | 9/2001 | Nakahira et al. | 363/19 |
| 6,366,480 B2 | * | 4/2002 | Hosotani et al. | 363/21.14 |
| 6,639,811 B2 | * | 10/2003 | Hosotani et al. | 363/19 |

FOREIGN PATENT DOCUMENTS

| | | |
|---|---|---|
| JP | 57-062774 | 4/1982 |
| JP | 08-289542 | 11/1996 |
| JP | 2002-034240 | 1/2002 |

OTHER PUBLICATIONS

International Search Report mailed Sep. 4, 2007, issued on PCT/JP2007/063103.

* cited by examiner

*Primary Examiner* — Rajnikant Patel
(74) *Attorney, Agent, or Firm* — Edwards Angell Palmer & Dodge LLP (57) ABSTRACT

A switching power supply includes an active device for pulling out a part of a control signal from a control terminal of the switching device in an RCC, and a control signal generation circuit that applies adjustment voltage as ON/OFF time control voltage to a control terminal of the active device. The active device pulls out the control signal so as to decrease or increase an OFF time of the switching device while fixing the ON time of the switching device when the adjustment voltage is decreased or increased in the active region of the active device, respectively. An element of a timing circuit in the RCC pulls out the control signal so as to increase or decrease an ON time of the switching device while fixing the OFF time of the switching device when the adjustment voltage is decreased or increased in the cut-off region of the active device, respectively.

5 Claims, 6 Drawing Sheets

SWITCHING POWER SUPPLY

TECHNICAL FIELD

The invention relates to generally switching power supplies and, more particularly, to an RCC (Ringing Choke Converter) type switching power supply capable of adjusting ON and OFF times of a switching device defining an oscillation frequency of the RCC while restraining an oscillation frequency range from spreading.

BACKGROUND ART

Japanese Patent Application Publication No. H08-289542 issued Nov. 1, 1996 discloses an RCC type switching power supply capable of narrowing a wide oscillation frequency range brought about in response to load variation. This power supply is provided with a detection circuit and a control circuit in addition to a switching device, a transformer, etc. constituting the RCC. The detection circuit detects output voltage of the RCC. The control circuit determines ON times of the switching device so as to stabilize output voltage of the RCC based on a signal from the detection circuit. The control circuit also lengthens a minimum OFF time of the switching device as output voltage of the RCC is higher. That is, the control circuit includes an ON time setting circuit and an OFF time setting circuit.

In this power supply, ON and OFF times of the switching device can be also adjusted by changing a signal obtained from the output of the RCC in case load impedance is constant, but the ON time setting circuit and the OFF time setting circuit are required.

DISCLOSURE OF THE INVENTION

It is therefore an object of the present invention to adjust ON and OFF times of a switching device defining an oscillation frequency of an RCC through a simple configuration in comparison with a conventional configuration for controlling the times individually, while restraining an oscillation frequency range from spreading.

A switching power supply of the present invention is a switching power supply comprising an RCC, and further comprises a pull-out circuit and a control signal generation circuit. The RCC is comprised of a transformer, an oscillation circuit and an output circuit. The transformer has a primary winding, a secondary winding and a feedback winding. The oscillation circuit includes a switching device and a timing circuit. The switching device is connected with a main DC power source through the primary winding connected in series with the switching device. The timing circuit supplies a control terminal of the switching device with a control signal for turning the switching device on and off based on an electric current flowing through the switching device and induction voltage across the feedback winding. The output circuit rectifies and smoothes voltage induced across the secondary winding to generate output voltage. The pull-out circuit includes a current detector and an active device. The current detector is connected in series with the switching device and detects an electric current flowing through the switching device. The control terminal of the active device is connected between the switching device and the current detector, and the active device can pull out a part of the control signal from the control terminal of the switching device. The control signal generation circuit changes reference voltage to generate ON/OFF time control voltage and applies the ON/OFF time control voltage to a control terminal of the active device. In case the ON/OFF time control voltage is decreased or increased in the active region of the active device, the active device pulls out the control signal so as to decrease or increase an OFF time of the switching device while fixing the ON time of the switching device, respectively. In case the ON/OFF time control voltage is decreased or increased in the cut-off region of the active device, an element of the timing circuit pulls out the control signal so as to increase or decrease an ON time of the switching device while fixing the OFF time of the switching device, respectively.

In this invention, in case the ON/OFF time control voltage is decreased or increased in the active region of the active device, the active device decreases or increases an OFF time of the switching device while fixing the ON time of the switching device, respectively. Also, in case the ON/OFF time control voltage is decreased or increased in the cut-off region of the active device, the element of the timing circuit increases or decreases an ON time of the switching device while fixing the OFF time of the switching device, respectively. Consequently, it is possible to adjust ON and OFF times of a switching device through a simple configuration in comparison with a conventional configuration for controlling the times individually, while restraining an oscillation frequency range from spreading.

Preferably, the output circuit includes a smoothing capacitor and a rectifier diode, and the control signal generation circuit includes a reference voltage circuit and a differential amplifier. The positive terminal of the smoothing capacitor is connected with one end of the secondary winding. The anode and cathode of the rectifier diode are respectively connected with the negative terminal of the capacitor and the other end of the secondary winding. The reference voltage circuit stabilizes voltage from at least the positive terminal of the capacitor to generate said reference voltage. One input terminal of the amplifier is supplied with voltage from the negative terminal of the capacitor. Another input terminal of the amplifier is supplied with voltage obtained by dividing the reference voltage by a series circuit including a impedance element of which impedance is variable. The output voltage of the amplifier, as said ON/OFF time control voltage, is applied to the control terminal of the active device.

In an embodiment, the series circuit is comprised of a fixed resistor and the impedance element that are connected in series with each other. The impedance element is a variable resistor. In an alternate embodiment, the impedance element is a thermistor.

In an enhanced embodiment, the switching power supply further comprises a shutdown circuit having a comparator. One input terminal of the comparator is supplied with the voltage obtained by dividing the reference voltage by the series circuit. Another input terminal of the comparator is supplied with threshold voltage. The comparator turns the active device on to pull out all of the control signal from the control terminal of the switching device when the voltage supplied to the one input terminal of the comparator exceeds or falls below the threshold voltage. In this configuration, the self-excited oscillation of the RCC can be suspended based on change of circumstances (e.g., an ambient temperature).

BRIEF DESCRIPTION OF THE DRAWINGS

Preferred embodiments of the invention will now be described in further details. Other features and advantages of the present invention will become better understood with regard to the following detailed description and accompanying drawings where.

BEST MODE FOR CARRYING OUT THE INVENTION

Figure 1:
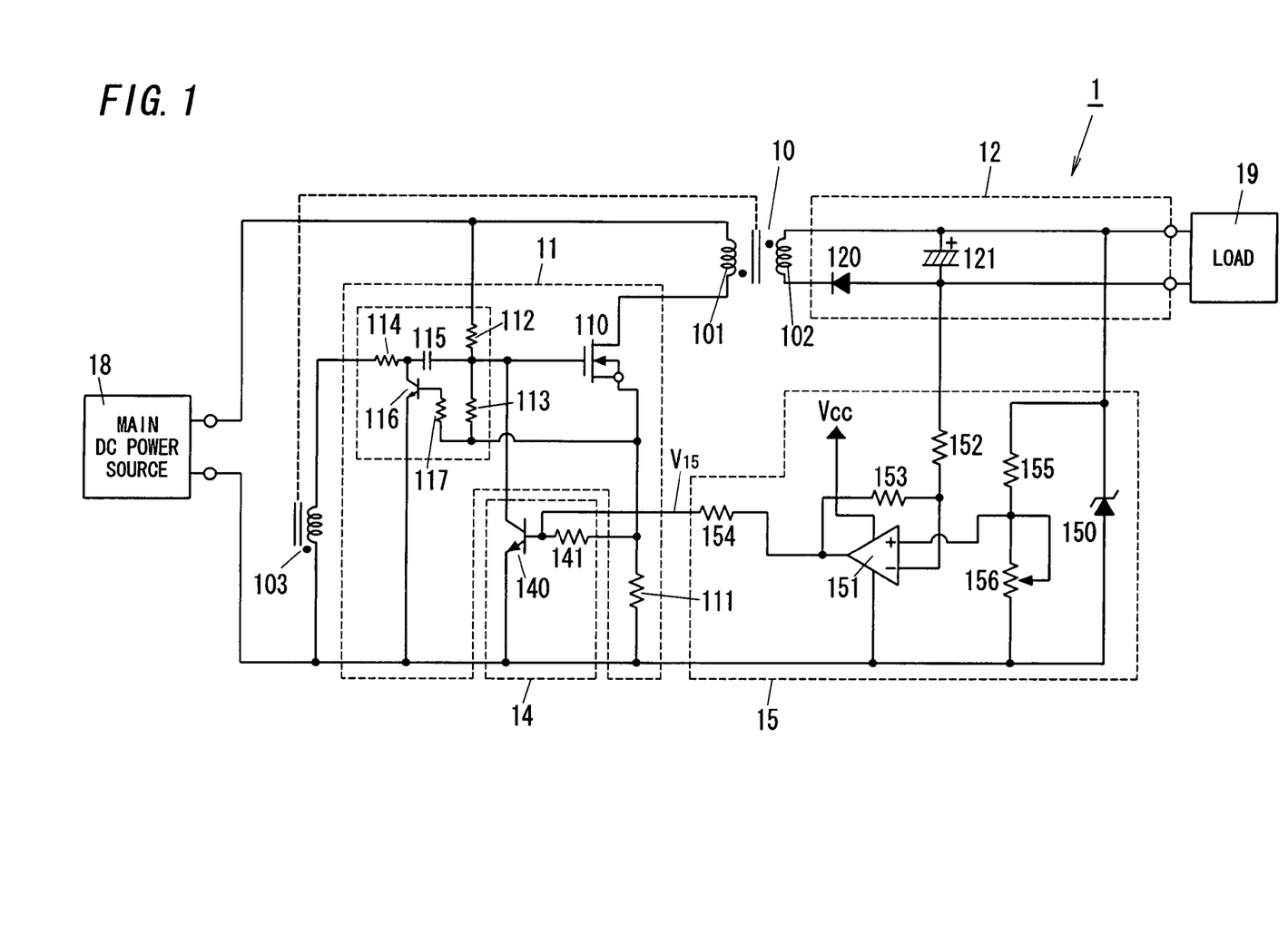
FIG. 1 is a circuit diagram of a switching power supply, in accordance with a first embodiment of the present invention.

FIG. 1 shows a first embodiment according to the present invention, i.e., an RCC type switching power supply 1. For example, the power supply 1 has a transformer 10, an oscillation circuit 11, an output circuit 12, a pull-out circuit 14 and a control signal generation circuit 15, and is used for various pieces of apparatus such as an electrostatic atomizer or the like. The transformer 10, oscillation circuit 11 and output circuit 12 constitute an RCC (Ringing Choke Converter).

This RCC is connected with a main DC power source 18 that is formed of, for example, a battery, or a circuit that rectifies and smoothes AC power. The transformer 10 has a primary winding 101, a secondary winding 102 and a feedback winding 103.

The oscillation circuit 11 includes a switching device 110 (e.g., an N-type MOSFET) that is connected with the power source 18 through the primary winding 101 connected in series with the device 110. This circuit 11 is configured to supply a control terminal of the device 110 with a control signal for turning the device 110 on and off based on an electric current flowing through the device 110 and induction voltage across the feedback winding 103.

In the example of FIG. 1, the circuit 11 has: the switching device 110; resistors 111-113 constituting a start circuit; a resistor 114 and a capacitor 115 that constitute an RC circuit; and a NPN-type transistor 116 and a resistor 117 that constitute a turn-off circuit. The resistors 112-114 and 117, capacitor 115 and transistor 116 also constitute a timing circuit. However, not limited to this timing circuit, conventional various oscillation circuits (timing circuits) can be applied to the oscillation circuit of the present invention. The drain terminal of the device 110 is connected with the positive terminal of the power source 18 through the primary winding 101, and the source terminal is connected with the negative terminal of the power source 18 through the resistor 111. The resistor 112 is connected between the positive terminal of the power source 18 and the gate terminal (control terminal) of the device 110, and the resistor 113 is connected between the gate terminal and the junction of the source terminal of the device 110 and the resistor 111. The resistor 111 also functions as a current detector (e.g., a low resistor) that detects an electric current flowing through the device 110. One end of the resistor 114 is connected with the gate terminal of the device 110 through the capacitor 115, and the other end is connected with the negative terminal of the power source 18 through the feedback winding 103. The resistor 114 and capacitor 115 have a function that a rise time of voltage induced across the feedback winding 103 is delayed by the RC time constant.

The output circuit 12 is configured to generate output voltage (e.g., high voltage) by rectifying and smoothing voltage induced across the secondary winding 102 and to supply the output voltage to a load 19. For example, the circuit 12 is constructed of a rectifier diode 120 and a smoothing capacitor 121. The positive terminal of the capacitor 121 is connected with one end of the winding 102, and the anode and cathode of the diode 120 are respectively connected with the negative terminal of the capacitor 121 and the other end of the winding 102.

The pull-out circuit 14 includes an active device 140 for pulling out at least a part of the control signal from the gate terminal (control terminal) of the switching device 110. For example, the circuit 14 is constructed of the active device 140 (e.g., an NPN-type transistor) and a resistor 141. The collector and emitter of the device 140 are connected with the gate terminal of the device 110 and the negative terminal of the power source 18, respectively. The resistor 141 is connected between the base terminal (control terminal) of the device 140 and the junction of the device 110 and resistor 111.

The control signal generation circuit 15 is configured to generate ON/OFF time control voltage V15 by changing reference voltage and to apply the voltage V15 to the base terminal of the device 140. For example, the circuit 15 is constructed of a Zener diode 150, an operational amplifier 151, resistors 152-155 and an impedance element 156. The cathode and anode of the diode 150 are connected between the positive terminal of the capacitor 121 and the negative terminal of the power source 18, respectively, and the diode 150, as a reference voltage circuit, stabilizes voltage from the positive terminal of the capacitor 121 to generate the reference voltage (Zener voltage).

The operational amplifier 151 operates by voltage Vcc supplied from a DC power supply circuit (not shown). The resistor 152 is connected between the inverting input terminal of the amplifier 151 and the negative terminal of the capacitor 121. The resistor 153 is connected between the inverting input terminal and output terminal of the amplifier 151. The resistor 154 is connected between the output terminal of the amplifier 151 and the base of the device 140. The amplifier 151 and the resistors 152-154 constitute a differential amplifier. The inverting input terminal of the differential amplifier is supplied with voltage from the negative terminal of the capacitor 121. The non-inverting input terminal of the differential amplifier is supplied with voltage obtained by dividing the reference voltage by the series circuit of the resistor 155 and the impedance element 156. In the embodiment, the element 156 is a variable resistor of which impedance, namely resistance value is variable. The output voltage of the differential amplifier, as the ON/OFF time control voltage $V_{15}$, is applied to the base of the device 140.

Accordingly, in case the voltage $V_{15}$ is decreased or increased in the active region of the active device 140, the device 140 operates to pull out the control signal so as to decrease or increase an OFF time of the device 110 while fixing the ON time of the device 110, respectively. Also, in case the voltage $V_{15}$ is decreased or increased in the cut-off region of the device 140, the transistor 116 as an element of said timing circuit operates to pull out the control signal to increase or decrease an ON time of the device 110 while fixing the OFF time of the device 110, respectively. However, not limited to this, the element of the timing circuit of the present invention may be e.g., a Zener diode, used for conventional RCCs, for turning its switching device off, or the like.

The fundamental operation of the power supply 1, namely the self-excited oscillation operation of the RCC is now explained. When the RCC is connected with the main DC power source 18 through, for example, a power switch (not shown), the power source 18 applies DC voltage across the resistors 111-113 and then voltage across the resistors 113 and 111 (mainly resistor 113) rises. When this voltage reaches the turn-on voltage of the switching device 110, the device 110 is turned on, so that an electric current flows through the primary winding 101 while increasing. The increasing current flows into the resistor 111, and can also flow into the resistor 117 and accordingly the device 110 can be turned off through the transistor 116. When the transistor 116 is activated (e.g., turned on), the transistor 116 pulls out an electric charge of the capacitor 115 to initialize the RC circuit. The transistor 116 also turns the device 110 off. When the device 110 is turned off, voltage is generated across the secondary winding 102. The output circuit 12 rectifies and smoothes the voltage across the winding 102 to generate output voltage, and supplies the output voltage to the load 19. The winding 102 then swings extremely few remaining energy back to the feedback winding 103, so that voltage is generated across the winding 103. The voltage across the winding 103 is applied to the gate terminal of the device 110 through the RC circuit. When the voltage applied to the gate terminal reaches the turn-on voltage of the device 110, the device 110 is turned on. Afterwards, like operation is repeated, and fundamental ON and OFF times of the device 110 are defined by the self-excited oscillation operation.

The characteristic operation of the power supply 1 in the self-excited oscillation operation is explained with reference to FIGS. 2A and 2B. In the term T1 of FIGS. 2A and 2B, when a user decreases resistance value of the impedance element 156, the ON/OFF time control voltage $V_{15}$ of the control signal generation circuit 15 is decreased in the active region of the active device 140. In this case, a part of the control signal supplied to the gate terminal of the device 110 is pulled out by the device 140 in response to the level of the voltage $V_{15}$. For example, when the voltage $V_{15}$ is decreased from the level at a point in time t11 to the level at a point in time t12, the timing at which the device 110 is tuned on through the self-excited oscillation in case of the point in time t12 is more advanced than that in case of the point in time t11. Because the device 140 pulls out less signal components (see "COLLECTOR CURRENT OF TRANSISTOR (i.e., device 140)" in FIG. 2B) from the control signal supplied to the gate terminal of the device 110. Therefore, when the voltage $V_{15}$ is decreased in the active region of the device 140, ON timing of the device 110 is advanced, so that the OFF time of the device 110 is decreased. The ON time by the self-excited oscillation is kept as the ON time of the device 110 in this case, and accordingly the oscillation frequency is increased. The OFF time of the device 110 is also decreased and thereby a ratio of ON time in one period of the oscillation frequency is increased, so that output voltage of the output circuit 12 is increased.

Figure 2A:
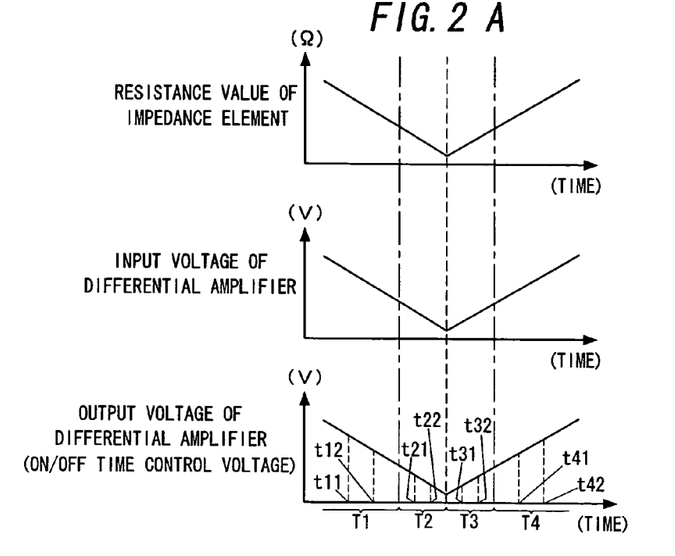
FIG. 2A is an explanatory diagram of operation of the switching power supply.
Figure 2B:
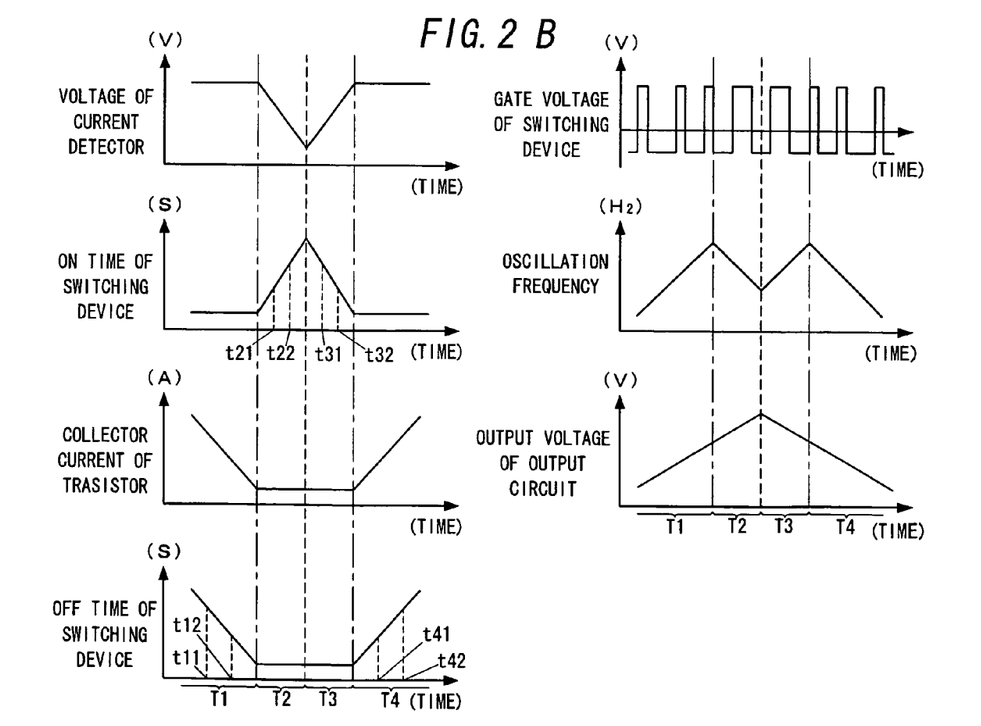
FIG. 2B is an explanatory diagram of operation of the switching power supply.

In the term T4 of FIGS. 2A and 2B, when the user increases resistance value of the impedance element 156, the voltage $V_{15}$ is increased in the active region of the device 140. For example, when the voltage $V_{15}$ is increased from the level at a point in time t41 to the level at a point in time t42, the timing at which the device 110 is tuned on through the self-excited oscillation in case of the point in time t42 is more delayed than that in case of the point in time t41. Because the device 140 pulls out more signal components from the control signal supplied to the gate terminal of the device 110. Therefore, when the voltage $V_{15}$ is increased in the active region of the device 140, ON timing of the device 110 is delayed, so that the OFF time of the device 110 is increased. Since the ON time by the self-excited oscillation is kept as the ON time of the device 110 in this case, the oscillation frequency is decreased. The OFF time of the device 110 is also increased and thereby a ratio of ON time in one period of the oscillation frequency is decreased, so that output voltage of the output circuit 12 is decreased.

In the term T2 of FIGS. 2A and 2B, when the user decreases resistance value of the impedance element 156, the voltage $V_{15}$ is decreased in the cut-off region of the active device 140. In this case, even when the device 110 is off, the circuit 15 applies bias voltage across the resistor 111 and accordingly the timing at which the transistor 116 is turned on is advanced in comparison with the case without the circuit 15. For example, when the voltage $V_{15}$ is decreased from the level at a point in time t21 to the level at a point in time t22, the timing at which the transistor 116 is tuned on through the self-excited oscillation in case of the point in time t22 is more delayed than that in case of the point in time t21. Therefore, when the voltage $V_{15}$ is decreased in the cut-off region of the device 140, ON timing of the transistor 116 is delayed and then the OFF timing of the device 110 is delayed, so that the ON time of the device 110 is increased. Since the OFF time by the self-excited oscillation is kept as the OFF time of the device 110 in this case, the oscillation frequency is decreased. The ON time of the device 110 is also increased and thereby a ratio of ON time in one period of the oscillation frequency is increased, so that output voltage of the output circuit 12 is increased.

In the term T3 of FIGS. 2A and 2B, when the user increases resistance value of the impedance element 156, the voltage $V_{15}$ is increased in the cut-off region of the device 140. For example, when the voltage $V_{15}$ is increased from the level at a point in time t31 to the level at a point in time t32, the timing at which the transistor 116 is tuned on through the self-excited oscillation in case of the point in time t32 is more advanced than that in case of the point in time t31. Therefore, when the voltage $V_{15}$ is increased in the cut-off region of the device 140, ON timing of the transistor 116 is advanced and then OFF timing of the device 110 is advanced, so that the ON time of the device 110 is decreased. Since the OFF time by the self-excited oscillation is kept as the OFF time of the device 110 in this case, the oscillation frequency is increased. The ON time of the device 110 is also decreased and thereby a ratio of ON time in one period of the oscillation frequency is decreased, so that output voltage of the output circuit 12 is decreased.

Therefore, as shown in "OSCILLATION FREQUENCY", "ON TIME OF SWITCHING DEVICE" and "OFF TIME OF SWITCHING DEVICE" in FIG. 2B, it is possible to adjust ON and OFF times of the device 110 through simple configuration in comparison with conventional configuration for individually controlling the times while restraining the oscillation frequency range from spreading.

Figure 3:
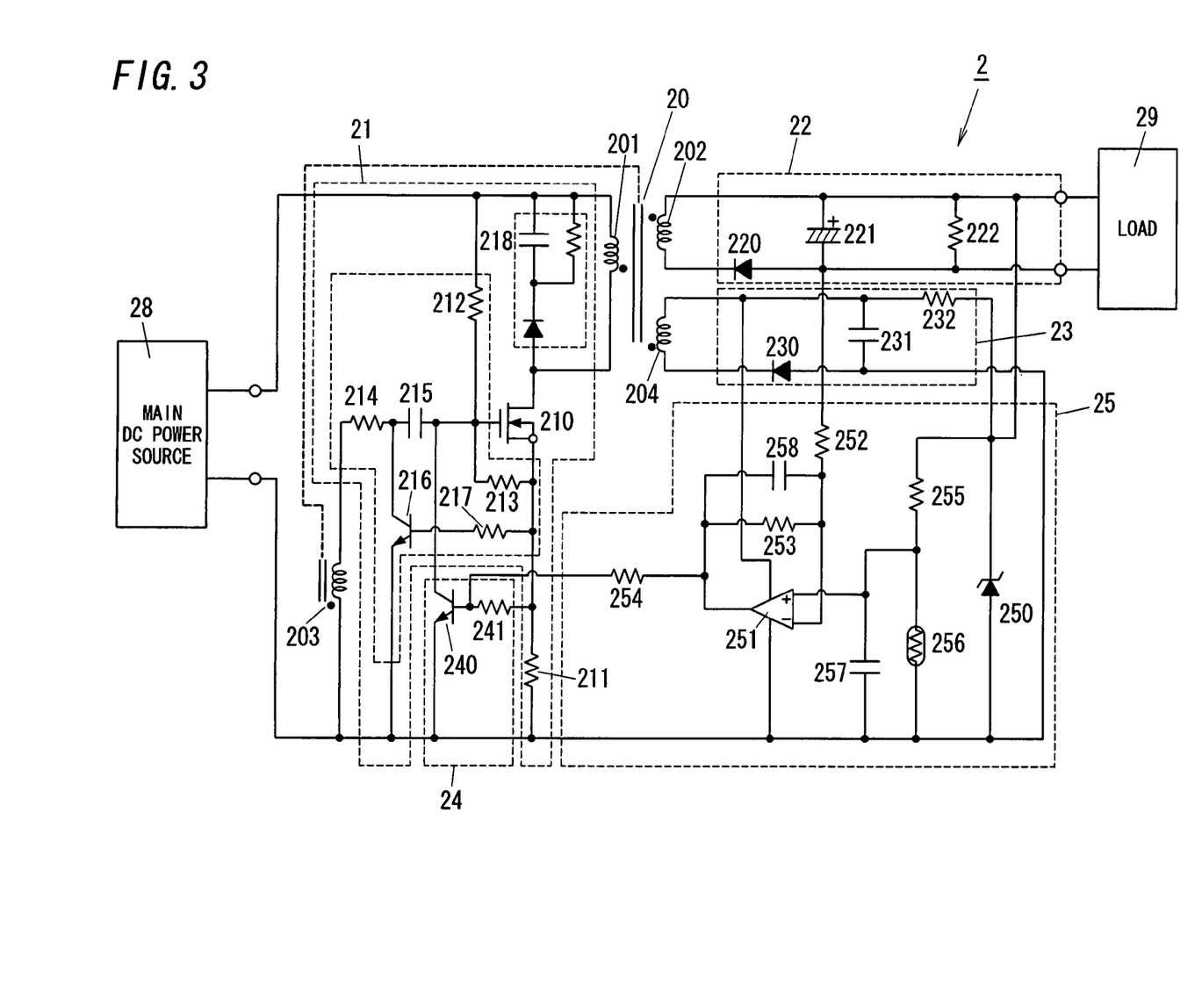
FIG. 3 is a circuit diagram of a switching power supply, in accordance with a second embodiment of the present invention.
Figure 4:
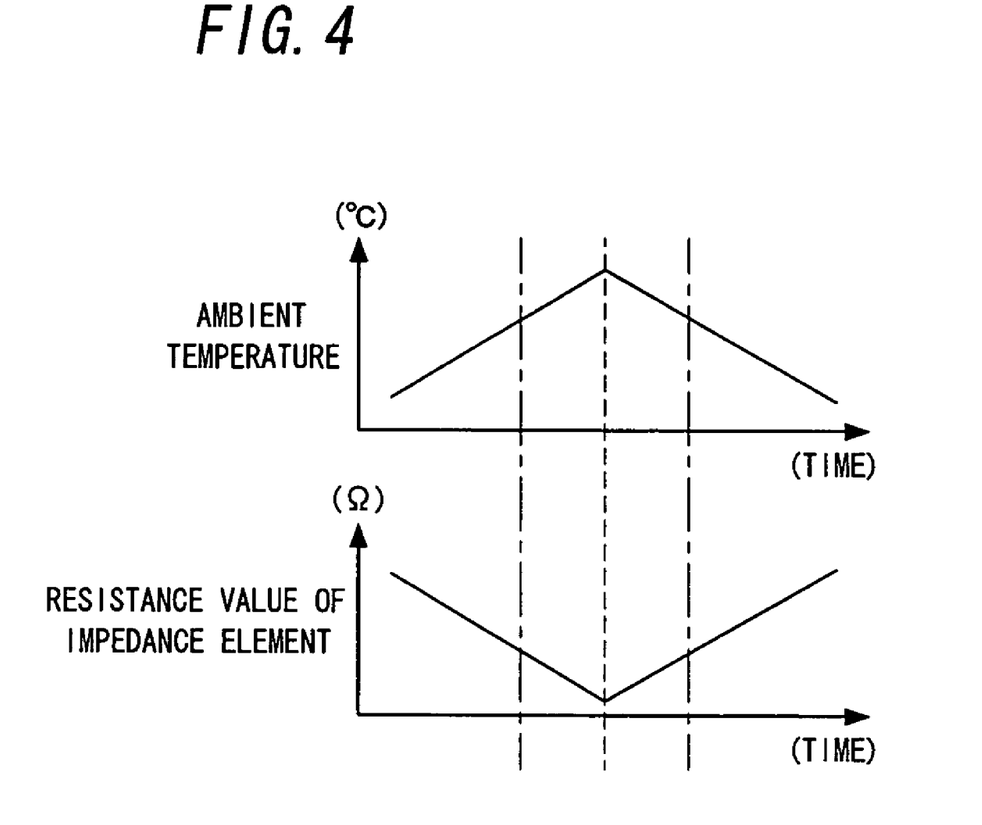
FIG. 4 is an explanatory diagram of operation of the switching power supply.

FIG. 3 shows a second embodiment according to the present invention, i.e., an RCC type switching power supply 2. This power supply 2 has a transformer 20, an oscillation circuit 21, an output circuit 22, a DC power supply circuit 23, a pull-out circuit 24 and a control signal generation circuit 25. The transformer 20, oscillation circuit 21 and output circuit 22 constitute an RCC.

This RCC is connected with a main DC power source 28 that is formed of, for example, a battery, or a circuit that rectifies and smoothes AC power. The transformer 20 has a primary winding 201, secondary windings 202 and 204, and a feedback winding 203.

The oscillation circuit 21 has a switching device 210; resistors 211-213 constituting a start circuit; a resistor 214 and a capacitor 215 that constitute an RC circuit; and a transistor 216 and a resistor 217 that constitute a turn-off circuit, in the same way as the circuit 11 of the first embodiment. The circuit 21 further has a snubber circuit 218. This circuit 218 is constructed of, for example, a capacitor, a diode and a resistor, and is connected in parallel with the primary winding 201. The circuit 218 restrains surge voltage generated across the winding 201

The output circuit 22 has a rectifier diode 220 and a smoothing capacitor 221 like the circuit 12 of the first embodiment, and further has a resistor 222 connected in parallel with the capacitor 221. The output voltage of the circuit 22 is supplied to a load 29.

The DC power supply circuit 23 is configured to generate DC voltage by rectifying and smoothing voltage induced across the secondary winding 204 and to supply the DC voltage to the control signal generation circuit 25. For example, the circuit 23 is constructed of a rectifier diode 220, a smoothing capacitor 231 and a resistor 232. The positive terminal of the capacitor 231 is connected with one end of the winding 204, and the anode and cathode of the diode 230 are respectively connected with the negative terminal of the capacitor 231 and the other end of the winding 204. The resistor 232 is connected between the positive terminal of the capacitor 231 and the circuit 25.

The pull-out circuit 24 is constructed of an active device 240 (e.g., an NPN-type transistor) and a resistor 241 in the same way as the circuit 14 of the first embodiment.

The control signal generation circuit 25 has a Zener diode 250, an operational amplifier 251, resistors 252-255 and an impedance element 256 like the circuit 15 of the first embodiment, and further has capacitors 257 and 258. The capacitor 257 is connected in parallel with the element 256, and the capacitor 258 is connected in parallel with the resistor 253. The diode 250 as a reference voltage circuit stabilizes voltage from the positive terminal of the capacitor 221 and the DC power supply circuit 23 to generate reference voltage. The element 256 of the second embodiment is a thermistor of which impedance, namely resistance value is changed in response to an ambient temperature. When the ambient temperature rises, the resistance value of the element 256 is decreased. When the ambient temperature falls, the resistance value of the element 256 is increased.

Therefore, the operation of the second embodiment is the same as that of the first embodiment except that the resistance value of the element 256 is changed by not a user but an ambient temperature.

Figure 5:
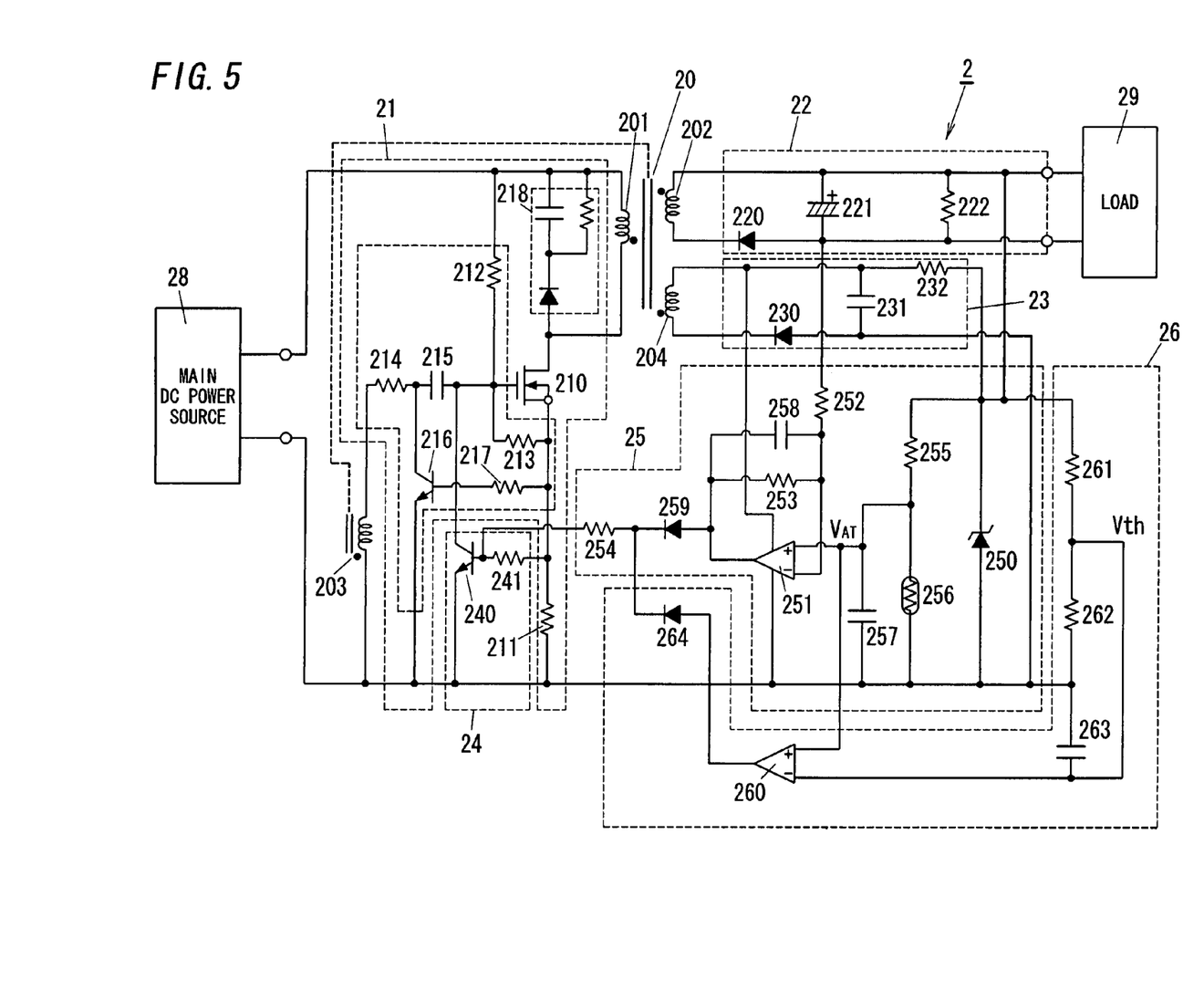
FIG. 5 is a circuit diagram of an enhanced embodiment.

In an enhanced embodiment, the switching power supply 2 is further equipped with a shutdown circuit 26 having a comparator 260. For example, as shown in FIG. 5, the circuit 26 includes resistors 261 and 262, a capacitor 263 and a diode 264 in addition to the comparator 260. The resistor 261 is connected in series with the resistor 262, while the series combination of the resistors 261 and 262 is connected in parallel with the Zener diode 250. The capacitor 263 is connected in parallel with the resistor 262. The inverting input terminal of the comparator 260 is connected with a junction of the resistors 261 and 262 and the capacitor 263, and is supplied with threshold voltage $V_{th}$ obtained by dividing said reference voltage by the resistors 261 and 262. The non-inverting input terminal of the comparator 260 is connected with a junction of the resistor 255 and the impedance element 256, and is supplied with voltage $V_{AT}$ changed in response to an ambient temperature. Also, in the control signal generation circuit 25, a diode 259 is connected between the resistor 254 and the output terminal of the amplifier 251, and the diode 264 of the circuit 26 is connected between the output terminal of the comparator 260 and a junction of the resistor 254 and the diode 259.

Figure 6:
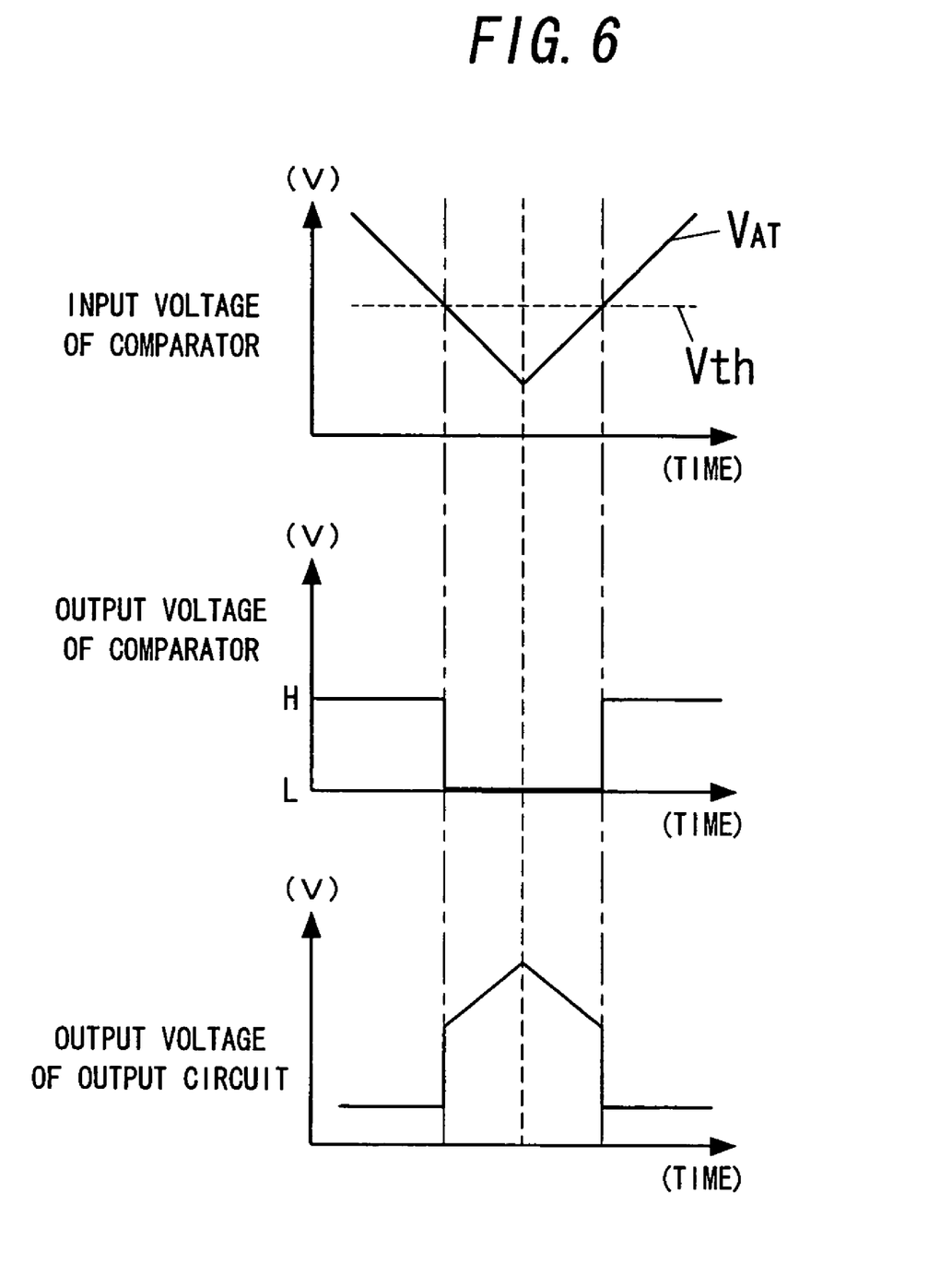
FIG. 6 is an explanatory diagram of operation of the embodiment.

The operation of the power supply 2 of FIG. 5 is explained with reference to FIG. 6. When an ambient temperature falls and the resistance value of the impedance element 256 is increased, the voltage $V_{AT}$ is increased. In this case, if the ambient temperature falls below a specified minimum temperature and the voltage $V_{AT}$ exceeds the threshold voltage $V_{th}$, the comparator 260 applies an H signal to the base terminal of the active device 240. As a result, the device 240 is turned on and then the switching device 210 is turned on, and accordingly the RCC suspends the self-excited oscillation. Afterwards, if the ambient temperature rises and the resistance value of the element 256 is decreased, the voltage $V_{AT}$ is decreased. In this case, if the ambient temperature exceeds the specified minimum temperature and the voltage $V_{AT}$ falls below the threshold voltage $V_{th}$, the comparator 260 changes to an L signal from the H signal. This L signal is not transmitted to the base terminal of the device 240 by the diode 264, and therefore the RCC can resume the self-excited oscillation. In this configuration, the self-excited oscillation of the RCC can be suspended based on variation of an ambient temperature.

In a modified embodiment, the inverting input terminal of the comparator 260 is connected with a junction of the resistor 255 and the impedance element 256, and is supplied with voltage $V_{AT}$ changed in response to an ambient temperature. In addition, the non-inverting input terminal of the comparator 260 is connected with a junction of the resistors 261 and 262 and the capacitor 263, and is supplied with the threshold voltage $V_{th}$. In this case, when an ambient temperature exceeds a specified maximum temperature, the self-excited oscillation of the RCC can be suspended.

Although the present invention has been described with reference to certain preferred embodiments, numerous modifications and variations can be made by those skilled in the art without departing from the true spirit and scope of this invention.

The invention claimed is:

1. A switching power supply, comprising an RCC that is comprised of:
   a transformer having a primary winding, a secondary winding and a feedback winding;
   an oscillation circuit that includes a switching device connected with a main DC power source through the primary winding connected in series with the switching device, and a timing circuit that supplies a control terminal of the switching device with a control signal for turning the switching device on and off based on an electric current flowing through the switching device and induction voltage across the feedback winding; and
   an output circuit that rectifies and smoothes voltage induced across the secondary winding to generate output voltage,
   wherein the switching power supply further comprises:
   a pull-out circuit that includes a current detector that is connected in series with the switching device and detects an electric current flowing through the switching device; and an active device of which control terminal is connected between the switching device and the current detector, said active device being capable of pulling out a part of the control signal from the control terminal of the switching device; and
   a control signal generation circuit that changes reference voltage to generate ON/OFF time control voltage and applies the ON/OFF time control voltage to a control terminal of the active device;

wherein:

the active device operates to pull out the control signal so as to decrease or increase an OFF time of the switching device while fixing the ON time of the switching device in case the ON/OFF time control voltage is decreased or increased in the active region of the active device, respectively; and an element of the timing circuit operates to pull out the control signal so as to increase or decrease an ON time of the switching device while fixing the OFF time of the switching device in case the ON/OFF time control voltage is decreased or increased in the cut-off region of the active device, respectively.

2. The switching power supply of claim 1, wherein:

the output circuit comprises a smoothing capacitor of which positive terminal is connected with one end of the secondary winding, and a rectifier diode of which anode and cathode are respectively connected with the negative terminal of the capacitor and the other end of the secondary winding; and the control signal generation circuit comprises a reference voltage circuit that stabilizes voltage from at least the positive terminal of the capacitor to generate said reference voltage, and a differential amplifier, one input terminal of the amplifier being supplied with voltage from the negative terminal of the capacitor, another input terminal of the amplifier being supplied with voltage obtained by dividing the reference voltage by a series circuit including a impedance element of which impedance is variable, output voltage of the amplifier being applied to the control terminal of the active device as said ON/OFF time control voltage.

3. The switching power supply of claim 2, wherein the series circuit is comprised of a fixed resistor and the impedance element that are connected in series with each other, the impedance element being a variable resistor.

4. The switching power supply of claim 2, wherein the series circuit is comprised of a fixed resistor and the impedance element that are connected in series with each other, the impedance element being a thermistor.

5. The switching power supply of claim 2, further comprising a shutdown circuit having a comparator, one input terminal of the comparator being supplied with the voltage obtained by dividing the reference voltage by the series circuit, another input terminal of the comparator being supplied with threshold voltage, the comparator turning the active device on to pull out all of the control signal from the control terminal of the switching device when the voltage supplied to the one input terminal of the comparator exceeds or falls below the threshold voltage.

* * * * *